(12) United States Patent
Mun et al.

(10) Patent No.: US 8,810,750 B2
(45) Date of Patent: Aug. 19, 2014

(54) BACKLIGHT UNIT AND DISPLAY DEVICE INCLUDING THE SAME

(75) Inventors: Yong-kweun Mun, Yongin-si (KR); Yoon-sun Choi, Yongin-si (KR); Hong-seok Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 13/179,440

(22) Filed: Jul. 8, 2011

(65) Prior Publication Data

US 2012/0008067 A1    Jan. 12, 2012

(30) Foreign Application Priority Data

Jul. 9, 2010  (KR) ................ 10-2010-0066411

(51) Int. Cl.
*G02F 1/1335* (2006.01)

(52) U.S. Cl.
USPC ............. 349/65; 349/56; 349/61; 349/62; 349/67; 349/68

(58) Field of Classification Search
USPC ............... 349/56, 61, 62, 65, 67, 68
See application file for complete search history.

(56) References Cited

U.S. PATENT DOCUMENTS

| 5,396,350 A | 3/1995 | Beeson et al. |
| 7,800,710 B2 * | 9/2010 | Sugihara et al. ............ 349/65 |
| 2002/0093607 A1 | 7/2002 | Van De Ven et al. |
| 2010/0208169 A1 * | 8/2010 | Mun et al. .................... 349/65 |

FOREIGN PATENT DOCUMENTS

| KR | 10-2007-0109430 | 11/2007 |
| KR | 10-2008-0031573 | 4/2008 |
| KR | 10-2009-0006592 | 1/2009 |
| KR | 10-2009-0011887 | 2/2009 |

OTHER PUBLICATIONS

Käläntär, K., Satou, C., Katoh, T., & Matsumoto, S. "Functional light-guide plate characterized by direct light-extraction microstructures for luminance enhancement of the transmissive and transflective LCD backlight units" In *Proc. 9th Intl. Display Workshops* (Dec. 2002) pp. 509-512.

* cited by examiner

*Primary Examiner* — Jennifer Doan
(74) *Attorney, Agent, or Firm* — NSIP Law (57) ABSTRACT

A backlight unit and a display device including the backlight unit are provided. The backlight unit includes at least one light source unit and a light guide plate. The light source unit provides collimated light and controls light such that it is emitted in a plurality of light exit directions.

19 Claims, 10 Drawing Sheets

BACKLIGHT UNIT AND DISPLAY DEVICE INCLUDING THE SAME

CROSS-REFERENCE TO RELATED APPLICATIONS

This application claims the benefit of Korean Patent Application No. 10-2010-0066411, filed on Jul. 9, 2010, in the Korean Intellectual Property Office, the disclosure of which is incorporated herein in its entirety by reference.

BACKGROUND

1. Field

The following description relates to backlight units and display devices including backlight units, and more particularly, to backlight units that provide collimated light.

2. Description of the Related Art

Backlight units (BLU) may supply light in liquid crystal display devices. However, backlight units may not be self-emitting devices.

A general backlight unit emits radially spreading light, that is, Lambertian light, to a liquid crystal layer. Thus, luminance and colors of light that vary according to viewing angles, due to various lengths of an optical path of light that passes through the liquid crystal layer, need to be compensated for to produce a clear image for a user. On the other hand, in a collimation backlight unit that provides collimated light, a length of an optical path of light that passes through a liquid crystal layer does not significantly change, and thus luminance and color compensation characteristics of light are improved.

By providing collimated light in a backlight unit and forming a diffuser on a liquid crystal panel, a viewing angle may be presented.

In addition, three-dimensional (3D) displays may also require collimated light according to the configuration of systems. For example, a high-density directional (HDD) display, integral imaging, and holography each typically requires collimated light. Highly collimated light generally improves the performance of systems or simplifies the design of systems.

SUMMARY

In one general aspect, backlight units and display devices provide collimated light and are capable of controlling a direction of the collimated light.

According to an aspect of the present invention, a backlight unit includes: a light source unit for providing collimated light and for controlling the collimated light to be emitted in a plurality of light exit directions; and a light guide plate including a light guide unit for guiding light incident from the light source unit by total internal reflection and a plurality of light exit units formed as protrusions on a surface of the light guide unit so as to emit light proceeding through the light guide unit by reflection.

The light source unit may include: a plurality of light sources disposed at different heights to emit light at different heights in a thickness direction of the light guide plate; and a collimating lens that is disposed at a light incident surface of the light guide plate and collimates incident light, and which emits light from the plurality of light sources in different light exit directions from the light guide plate.

The collimating lens may be asymmetric and refracts the light emitted from the plurality of light sources to be incident to the light guide plate at different incident angles.

The collimating lens may be disposed between the plurality of light sources and the light guide plate such that a curved lens surface of the collimating lens is separated from the light incident surface of the light guide plate.

The collimating lens may be formed as a single unit with the light guide plate at the light incident surface of the light guide plate.

The light source unit may be inclined to the light incident surface of the light guide plate so that light emitted from the plurality of light sources is incident to the light guide plate at different incident angles.

The collimating lens may be substantially symmetric or asymmetric.

The plurality of light sources may be arranged in a stepwise arrangement, such that heights of the plurality of light sources vary stepwise, wherein the stepwise arrangement is repeated at least once such that each of a first group of light sources and a second group of light sources include at least one light source that is positioned at a each height.

The light source unit may include: a light source; a collimating lens disposed between the light source and the light guide plate to collimate incident light; and a device disposed between the collimating lens and the light guide plate, wherein the device is electrically adjustable to adjust a proceeding direction of the collimated light, wherein a light exit direction is controlled by varying an incident angle of light that is incident to the light guide plate by applying a signal to the electrically adjustable device.

The electrically adjustable device may be an electrowetting prism.

The light source unit may be formed as a first light source unit and a second light source unit which are disposed at substantially opposing sides of the light guide plate.

The light exit units may have a linear form having inverted trapezoidal protrusions.

The light source unit may be disposed at a side of the light guide plate, wherein the light exit units have a linear form having inverted trapezoidal protrusions.

The plurality of light sources may be arranged in a stepwise arrangement such that heights of the plurality of light sources vary stepwise, wherein the stepwise arrangement is repeated at least once such that each of a first group of the light sources and a second group of light sources includes at least one light source at each height.

According to another aspect of the present invention, a display device includes a light source unit; a light guide plate including a light guide unit and a plurality of light exit units; and a panel-type light modulation device that modulates light emitted from the backlight unit according to an input image signal to display an image.

The plurality of light sources may be sequentially driven to scan a collimated light beam to form a three-dimensional image.

The display devices according to the examples herein may scan a collimated light beam by sequentially driving the plurality of light sources to form a 3D image.

The plurality of light exit units may have a linear form having inverted trapezoidal protrusions.

The light source unit may be disposed at a side of the light guide plate, and the light exit units may have a linear form having inverted trapezoidal protrusions.

The backlight unit may provide collimated light and control a direction of the collimated light. Thus, by applying the backlight unit, a light exit direction may be quickly and

BRIEF DESCRIPTION OF THE DRAWINGS

These and/or other aspects may be apparent and more readily appreciated from the following described examples, taken in conjunction with the accompanying drawings.

Throughout the drawings and detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining an understanding of the methods, apparatuses, and/or systems described herein. Accordingly, various changes, modifications, and equivalents of the systems, apparatuses, and/or methods described herein will be suggested to those of ordinary skill in the art. In this regard, the described examples may have different forms and should not be construed as being limited to the descriptions set forth herein. Accordingly, the examples are merely described below, by referring to the figures, to explain aspects of the present description. Also, descriptions of well-known functions and constructions may be omitted for increased clarity and conciseness. As described herein, it is noted that terminology such as "totally internally reflected" is provided for descriptive purposes for the understanding of one of ordinary skill in the art; that is, it should be understood that such language is intended to indicate that substantially all light is reflected.

A backlight unit according to one example, as will be described below, provides collimated light and controls a direction of the light. The backlight unit uses characteristics of incident light, which may be maintained according to the design of a light guide plate. In the light guide plate, light is emitted through total internal reflection, and light is collimated by a lens disposed at a light incident unit. Thus, the light guide plate emits the light in a desired direction. In this case, a pattern of the light guide plate may be relatively simple, and a light exit direction may be controlled using an asymmetric form of the lens of the light incident unit or using a direction conversion device.

When the light exit direction is sequentially controlled so as to use the backlight unit as a scanning backlight unit, the backlight unit may be applied to a high-density directional (HDD) three-dimensional (3D) display. Accordingly, more active eye tracking may be provided in a holography system. When such a function of controlling the light exit direction is applied not only to the 3D display but to a three-color (red, green, and blue) light source, the backlight unit may function as a color separation back light unit which for substantially removing light loss.

Figure 1:
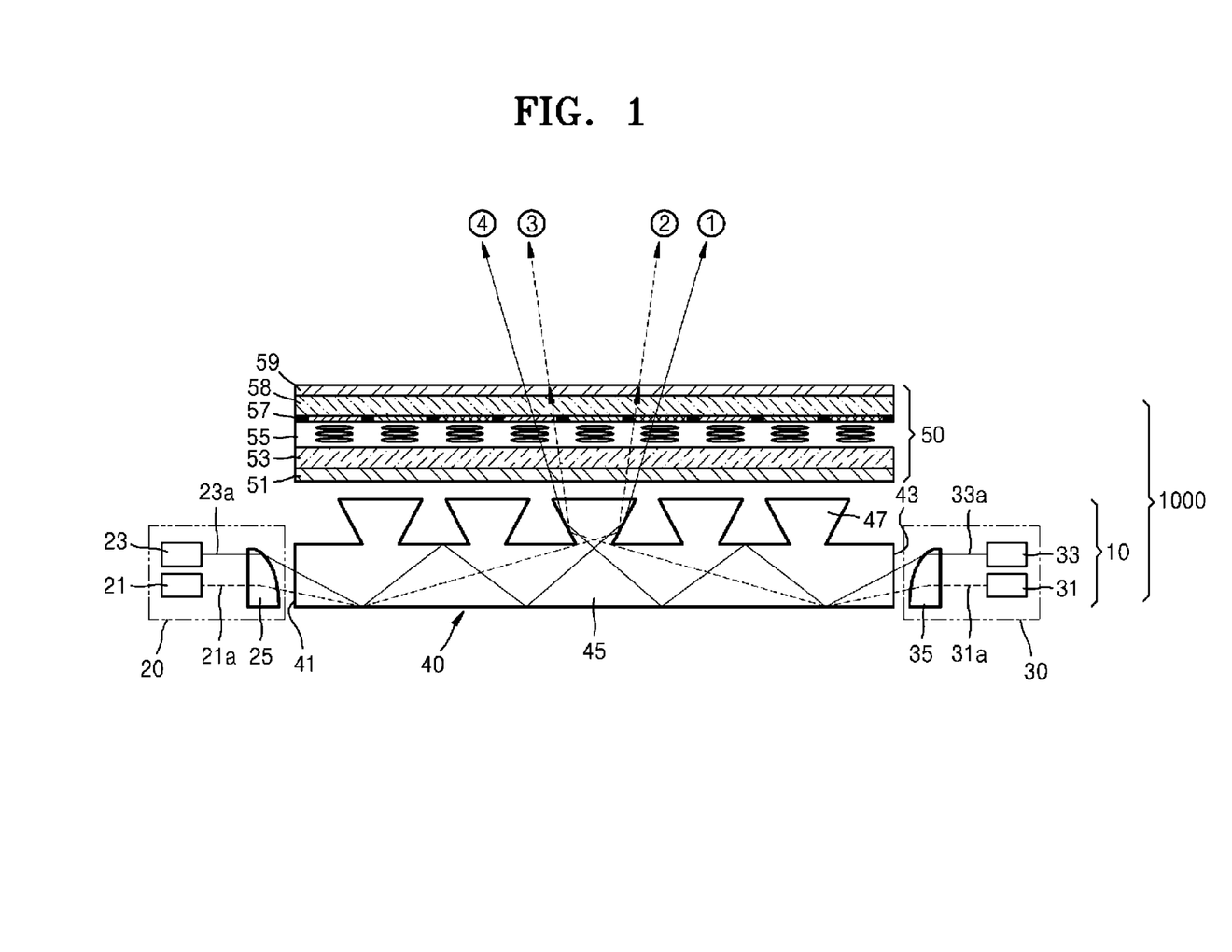
FIG. 1 is a schematic view illustrating an example of a backlight unit and a display device including the backlight unit.
Figure 2:
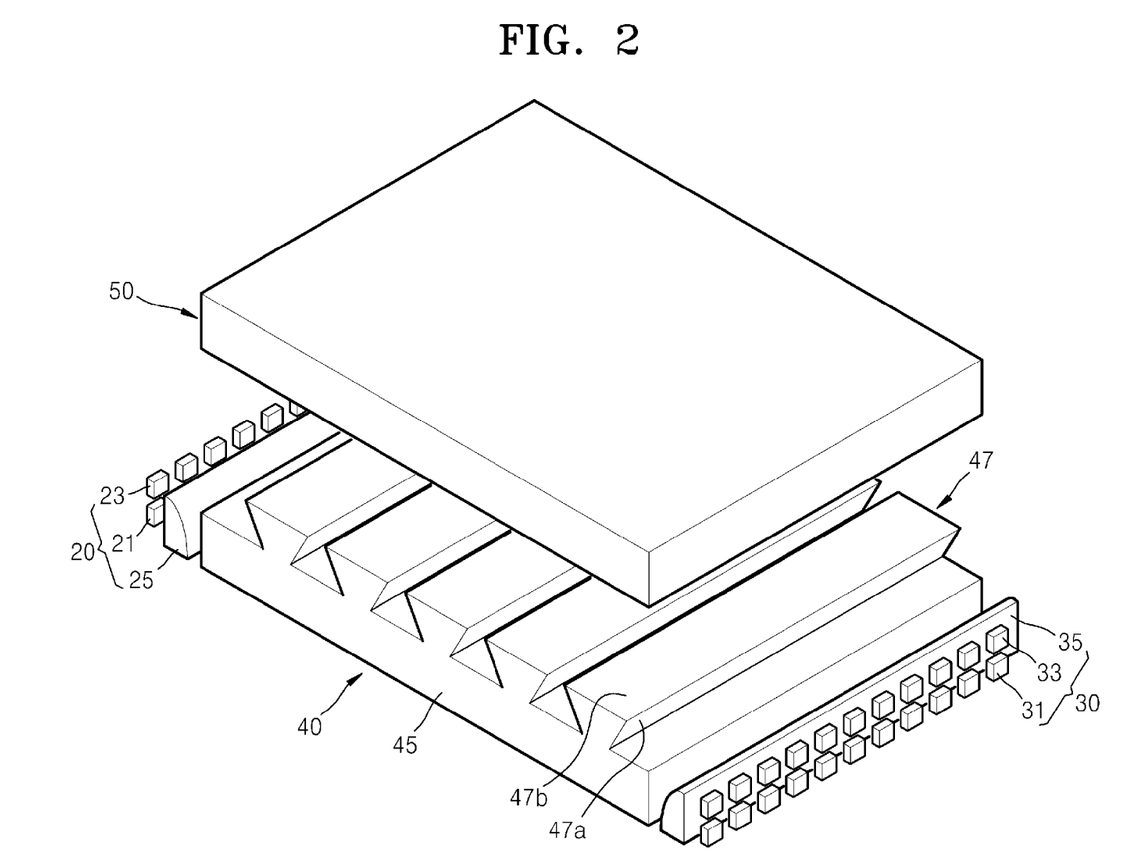
FIG. 2 is a perspective view illustrating an example of a light source arrangement of light source units in the backlight unit of FIG. 1.

FIG. 1 illustrates an example of a display device 1000 including a backlight unit 10. FIG. 2 illustrates an example of a light source arrangement of light source units in the backlight unit 10. The structure of a panel type light modulation device 50 illustrated in FIG. 1 is provided as an example, and the structure is not limited thereto; the panel type light modulation device 50 in the display device 1000 may be formed according to a variety of structures in which the backlight unit 10 is used.

Referring to FIGS. 1 and 2, the display device 1000 includes the backlight unit 10 and the panel type light modulation device 50 that modulates light irradiated from the backlight unit 10 according to an input image signal to display an image.

The backlight unit 10 includes first and second light source units 20 and 30 that provide and control collimated light. The light may be controlled such that the light is emitted in a plurality of light exit directions. A light guide plate 40 guides the light incident from the first and second light source units 20 and 30 through first and second light incident surfaces 41 and 43 via total internal reflection and emits the light without substantial variation in the characteristics of the light. In FIGS. 1 and 2, the backlight unit 10 includes the first and second light source units 20 and 30 at two sides of the light guide plate 40. However, as another example, only one light source unit may be formed at one side of the light guide plate 40.

The first light source unit 20 may include a plurality of light sources 21 and 23 that exit light at various heights in a thickness direction of the light guide plate 40. The first light source unit 20 may also include a first collimating lens 25 that is disposed at the first light incident surface 41 of the light guide plate 40. The first collimating lens 25 emits first and second lights 21a and 23a in different light exit directions from the light guide plate 40, the first and second lights 21a and 23a being received from the plurality of light sources 21 and 23 disposed at different heights.

The second light source unit 30 may include a plurality of light sources 31 and 33 that emit light at various heights in a thickness direction of the light guide plate 40. The second light source unit 30 may also include a second collimating lens 35 that is disposed at the second light incident surface 43 of the light guide plate 40. The second collimating lens 35 emits third and fourth lights 31a and 33a in different light exit directions from the light guide plate 40, the third and fourth lights 31a and 33a being received from the plurality of light sources 31 and 33 disposed at different heights.

The light guide plate 40 is included so that light that is incident at the first and second light incident surfaces 41 and 43 from the first and second light sources 20 and 30 is substantially uniformized in a surface of the light guide plate 40 through total internal reflection and emitted to the panel-type light modulation device 50. The light guide plate 40 includes a light guide unit 45 that guides the light incident at the first and second light incident surfaces 41 and 43 by total internal reflection and a plurality of light exit units 47, which are in the form of protrusions are formed on a surface of the light guide unit 45. Accordingly, the light guided by the light guide unit 45 is emitted via reflection (for example, to the panel-type light modulation device 50).

For example, referring to FIG. 2, the first light source unit 20 includes the first and second light sources 21 and 23 (disposed at different heights) and the first collimating lens 25. The second light source unit 30 includes the third and fourth light sources 31 and 33 (disposed at different heights) and the second collimating lens 35. The first through fourth light sources 21, 23, 31, and 33 may each include a plurality of light sources that are arranged in rows at predetermined heights, as illustrated in FIG. 2.

The first and second collimating lenses 25 and 35 may be asymmetric with respect to each other. The first collimating lens 25 refracts the first and second lights 21a and 23a to be incident to the first light incident surface 41 of the light guide plate 40 at different heights and at different incident angles. The second collimating lens 35 refracts the third and fourth lights 31a and 33a to be incident to the second light incident surface 43 of the light guide plate 40 at different heights and at different incident angles.

As described above, the first and second lights 21a and 23a are respectively emitted from the first and second light sources 21 and 23 disposed at different heights, are collimated and refracted by the first collimating lens 25, and are incident to the first light incident surface 41 of the light guide plate 40 at different heights and different incident angles. Further, the first and second lights 21a and 23a are internally reflected by the light guide plate 40, which only changes a proceeding direction of light while maintaining the characteristics of incident light (such as a collimated state), according to the total internal reflection characteristics of the light guide unit 45 and the shape of the structure of the light exit units 47. Thereby, the first and second lights 21a and 23a may be emitted in different light exit directions, that is, in first and second directions (As illustrated in FIG. 1 by symbols ① and ②, respectively).

The third and fourth lights 31a and 33a are respectively emitted from the third and fourth light sources 31 and 33 disposed at different heights, are collimated and refracted by the third collimating lens 35, and are incident to the third light incident surface 43 of the light guide plate 40 at different heights and different incident angles. Further, the third and fourth lights 31a and 33a are internally reflected by the light guide plate 40, which only changes a proceeding direction of light while maintaining the characteristics of incident light (such as a collimated state), thereby the third and fourth lights 31a and 33a may be emitted in different light exit directions, that is, in third and fourth directions (As illustrated in FIG. 1 by symbols ③ and ④, respectively).

The light guide plate 40 is included so as to emit the first through fourth lights 21a, 23a, 31a, and 33a which are incident from the first and second light source units 20 and 30 and collimated, without substantial variation in characteristics thereof (e.g., the collimated state). The light guide plate 40 may be implemented to only change the proceeding direction of the first through fourth lights 21a, 23a, 31a, and 33a. To this end, the light exit units 47 may be formed to emit the incident light through specular reflection, which may be understood to refer to reflection of light in a single predetermined direction. When light has the above-described characteristics of specular reflection, the light that is incident from one light source and proceeds through the light guide unit 45 is reflected by the light exit units 47 in a predetermined direction. Thus, light emitted from light sources at different light heights may be incident to the light guide plate 40 at different light incident angles due to the effect of an asymmetric collimating lens. As another example, the light incident to the light guide plate 40 may be emitted in a plurality of light exit directions by varying incident angles using an electrically adjustable device, which is described herein.

The light exit units 47 of the light guide plate 40 may have a denser distribution away from the first and second light source units 20 and 30, so that luminance of light emitted from the light guide plate 40 is as uniform as possible. That is, more light exit units 47 per unit length are formed away from the first and second light source units 20 and 30 than near the first and second light source units 20 and 30. Also, the size of the light exit units 47 may increase with distance away from the first and second light source units 20 and 30. However, for clarity of illustration, in the examples illustrated in FIGS. 1 and 2, as well as the subsequent drawings, the light exit units 47 are formed in uniform sizes and at uniform distances.

The light guide plate 40 may be formed of a transparent material. For example, the light guide plate 40 may be formed of a polydimethylsiloxane, a transparent and flexible material.

Figure 3:
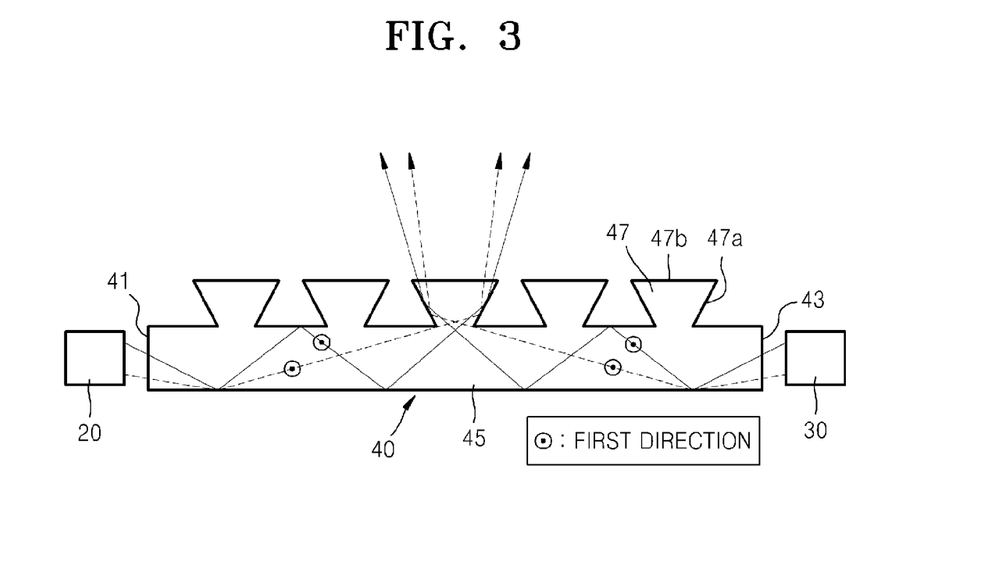
FIG. 3 is a diagram illustrating a portion of the backlight unit of FIG. 1.

FIG. 3 illustrates a portion of the backlight unit of FIG. 1. Referring to FIG. 3, the light exit units 47 of the light guide plate 40 each include a total internal reflection surface 47a inclined to the light guide unit 45 for specular reflection and maintains linearly polarized light (for example, in a first direction). Each of the light exit units 47 emits the light through a light exit surface 47b. The first direction is substantially parallel to the total internal reflection surface 47a and the light exit surface 47b, and the plurality of the light exit units 47 may each be linearly formed in the first direction.

The light exit units 47 may have a structure in which a cross-section of the light exit surface 47b emitting light is greater than a cross-section of a light incident portion of the light exit unit 47 to which light is incident from the light guide unit 45. That is, each of the light exit units 47 may be formed to have an inverted trapezoid shape along a cross-section. When the light exit units 47 have a linear form having an inverted trapezoidal protrusion, the inclined total internal reflection surface 47a inclined to the light guide unit 45 is symmetrically disposed at two sides of the light exit units 47. Thus, the first and second light source units 20 and 30 may be respectively located at two sides of the light guide plate 40.

As described above, when the light guide plate 40 has an inverted trapezoidal light exit structure, the incident light may be emitted only by total internal reflection through each surface, instead of irregular diffusion. Accordingly, the light that is incident to the light guide plate 40 due to the above-described light exit structure may maintain linearly polarized light in a direction parallel to the light exit surface 47b. Accordingly, speckle patterns, which occur when light is diffused on an irregular surface, may be substantially prevented from occurring.

Figure 4:
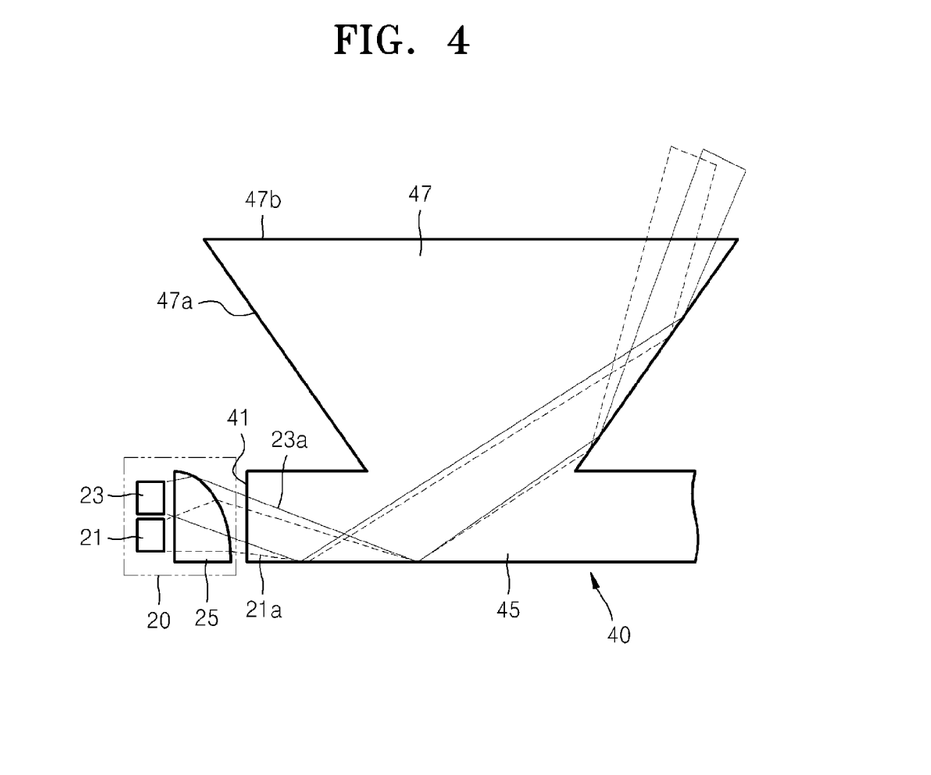
FIG. 4 is a diagram illustrating travelling paths of two lights that are incident at different heights and incident angles on an incident surface of a light guide plate.

FIG. 4 illustrates two paths of light that are incident to light incident surfaces at different heights and incident angles. Here, the light exit units 47 are enlarged for illustrative purposes, to clearly show light exit directions of the two lights. In FIG. 4, paths of first and second lights 21a and 23a, emitted from the first light source unit 20 of FIG. 1, are shown.

As illustrated in FIG. 4, the first and second light 21a and 23b, which are emitted from the first and second light sources 21 and 23 disposed at different heights, are collimated and refracted by the first collimating lens 25 and are incident to the first light incident surface 41 of the light guide plate 40 at different heights and different incident angles. Accordingly, the first and second light 21a and 23b are totally internally reflected by an internal surface of the light guide unit 45 and then totally internally reflected by the inclined total internal reflection surface 47a of the light exit units 47. Thereby, the first and second light 21a and 23b are emitted in different directions, that is, the first and second light exit directions (as illustrated in FIG. 1 by symbols ① and ②, respectively).

According to the backlight unit 10, as described in the above examples with reference to FIGS. 1 through 4, since the light guide plate 40 may emit incident light only by total internal reflection, characteristics other than the proceeding direction of incident light may be maintained. That is, when the collimated light from the first and second light source units 20 and 30 are incident to the light guide plate 40, the light may be emitted without any substantial loss of collimation characteristics. Accordingly, a collimation backlight unit 10 may be provided.

Also, a light exit direction may be adjusted by arranging light sources at different positions with respect to a collimating lens, because light emitted from different positions is collimated at different angles. Accordingly, by sequentially turning off the light sources at the different positions, the light exit direction of the collimated light may be sequentially adjusted, and thus a scanning feature may be obtained. For example, when the first and second light sources 21 and 23 of the first light source unit 20 and the third and fourth light sources 31 and 33 of the second light source unit 30 are turned off, scanning may be performed by sequentially adjusting the light exit direction to be from a first light exit direction→a second light exit direction→third light exit direction→fourth light exit direction.

Also, a viewing angle of the display device 1000 may be adjusted, or illumination can be supplied to only a desired view area, by selectively turning on each of the light sources at the different positions. Thus, an active backlight unit 10 may be implemented. For example, when a user uses a display device 1000 including the backlight unit 10, only a light source that emits light through the backlight unit 10 and a center portion of the panel type light modulation device 50 may be turned on, and thus energy consumption may be reduced. When two or three users use the display device 1000 including the backlight unit 10, other light sources may also be turned on to broaden the viewing angle. Alternatively, when viewers are located at different distances, a light source corresponding to the positions may be turned on. Accordingly, the display device may be efficiently operated.

In the above descriptions and corresponding illustrations, the light sources are arranged in two rows in each light source unit. However, the implementation of light sources is not limited thereto; the light sources may also be arranged in two or more rows. Even when a number of light sources are arranged in each row, a height at which light is emitted from the number of light sources of the same row is substantially the same, and thus light emitted from the light sources at the same height may be emitted from the light guide plate 40 in substantially the same light exit direction. When the light sources are arranged in two rows and the light source units including the light sources arranged in this manner are arranged at two sides of the light guide plate 40 as illustrated in FIG. 2, light may be emitted from the light guide plate 40 in two light exit directions for each of the light source units; when the light source units are arranged at two sides of the light guide plate 40, the number of light exit directions is doubled. When light sources in each light source unit are arranged in at least three rows, the number of light exit directions of light emitted from the light guide plate 40 may be increased to three or more. Again, when the light source units are arranged at two sides of the light guide plate 40, the number of light exit directions is doubled.

Figure 5A:
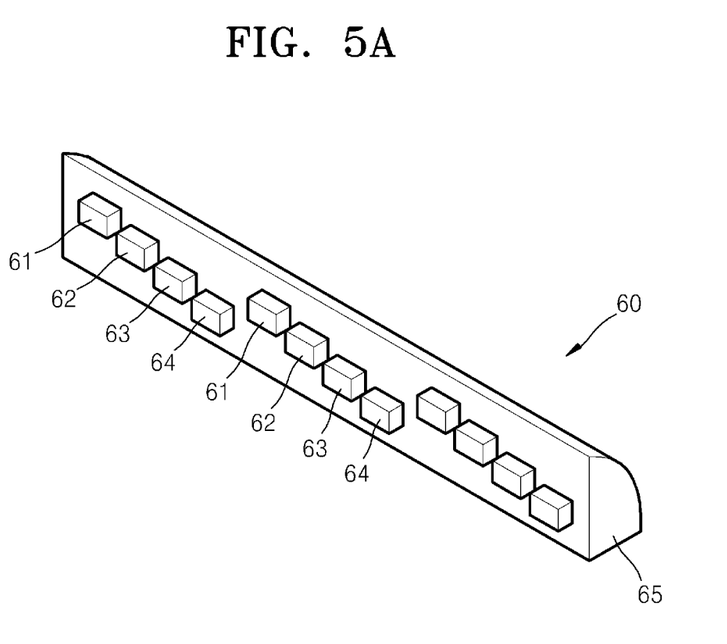
FIGS. 5A and 5B are, respectively, a perspective view and a front view illustrating a light source arrangement of light source units that may be applied to FIG. 1, according to another example.
Figure 5B:
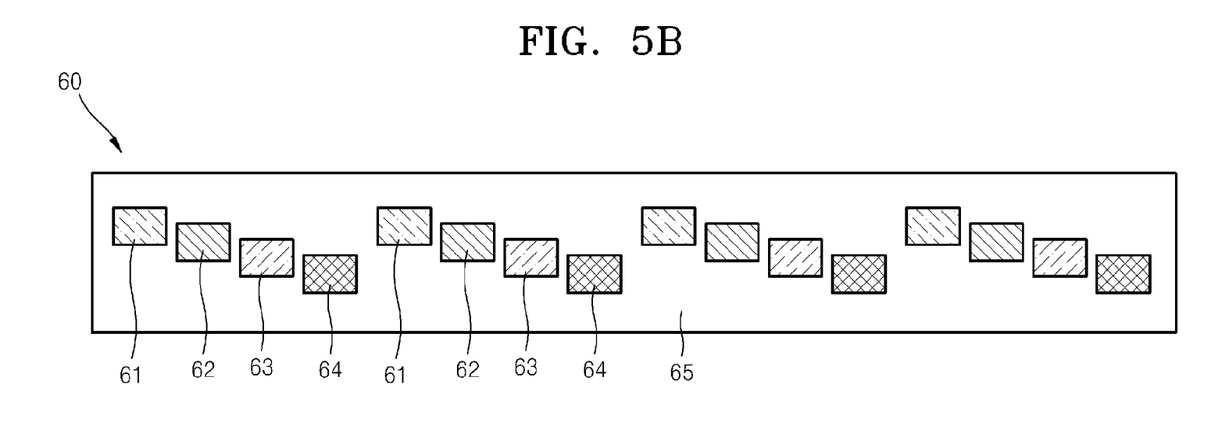
Figure 6:
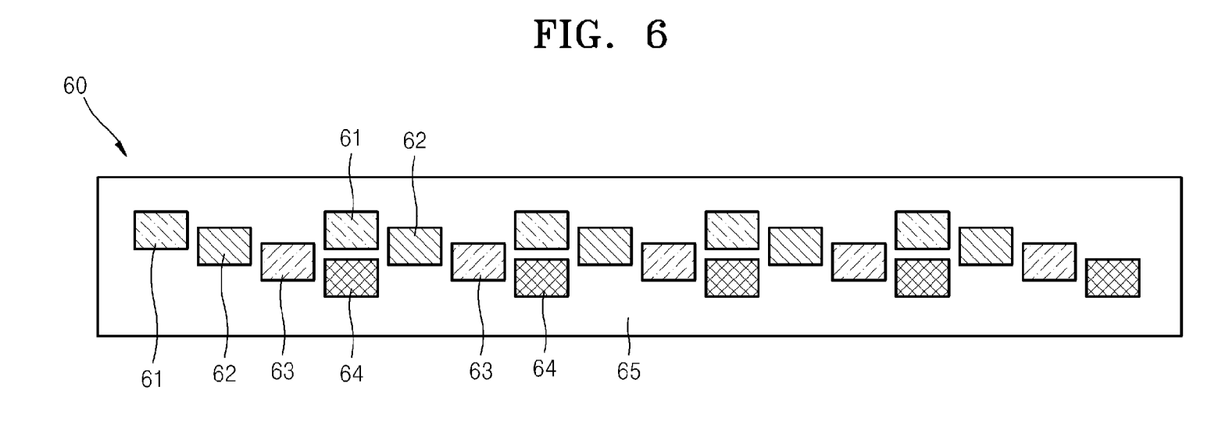
FIG. 6 is a front view illustrating another example of a light source arrangement of light source units that may be applied to FIG. 1.

Also, the light sources may be simply arranged in a plurality of rows, as illustrated in FIGS. 1 through 4 However, since direction change due to sequential flickering of light sources is basically discontinuous, the light sources may be arranged as illustrated in FIGS. 5A and 5B and FIG. 6 by increasing the density of light exit angles so as to obtain a more continuous conversion.

For example, as illustrated in FIGS. 5A and 5B, in a light source unit 60 including a plurality of light sources 61, 62, 63, and 64 and a collimating lens 65, the plurality of light sources 61, 62, 63, and 64 may be arranged in a stepwise manner such that heights of the light sources 61, 62, 63, and 64 vary stepwise. The stepwise arrangement may be repeated at least once. In this case, the light sources 61, 62, 63, and 64 include at least one light source at a corresponding height. For example, when the stepwise arrangement is repeated three times, three light sources are arranged at substantially the same heights, and thus the light sources 61, 62, 63, and 64 each include three light sources.

The light sources have substantially the same sizes as illustrated in FIGS. 5A and 5B, and thus the light sources are located stepwise such that portions of the light sources overlap in a height direction in the stepwise arrangement. Also, as illustrated in FIG. 6, by arranging the light sources stepwise such that portions of the light sources overlap in a height direction and by arranging some of the light sources such that at least one is vertically positioned over another, the light sources may be arranged more densely than as illustrated in FIGS. 5A and 5B. In order to more densely arrange the light sources than in FIGS. 5A and 5B, in FIG. 6, the light sources are arranged such that the light source located highest is positioned over the light source located lowest, in the stepwise arrangement of the light sources, and the plurality of light sources overlap each other in a stepwise arranged, wherein the arrangement of the light sources is repeated at least once.

In FIGS. 5A, 5B, and 6, the light sources are arranged in four steps, and this one stepwise arrangement is repeated. Thus the light sources may be arranged in four rows. Accordingly, by applying the light source unit 60 having the arrangement as illustrated in FIGS. 5A and 5B or FIG. 6 as the first and second light source units 20 and 30, respectively, light may be emitted, for example, in eight light exit directions, and thus density of light exit directions may be further increased By applying the arrangement of light sources as illustrated in FIGS. 5A, 5B, and 6, the number of light exit directions may be increased to three or more for each light source unit even when a vertical height of a light incident surface of the collimating lens 65 and sizes of the first and second light incident surfaces 41 and 43 of the light guide plate 40 are great enough such that light sources may be simply arranged only in two rows as illustrated in FIG. 2.

In FIGS. 5A, 5B, and 6, the light sources are arranged in four rows; however, the number of rows in which the light sources are arranged may be increased or reduced according to necessity. Additionally, the light sources may be arranged other stepwise arrangements, such as the light source located highest being only partially positioned over the light source located lowest, or the light source located highest being positioned over a light source other than the light source located lowest.

In FIG. 1, the first and second collimating lenses 25 and 35 may be formed separately from the light guide plate 40 such that a curved lens surface of the first and second collimating lenses 25 and 35 is separated from the first and second light incident surfaces 41 and 43 of the light guide plate 40.

Figure 7:
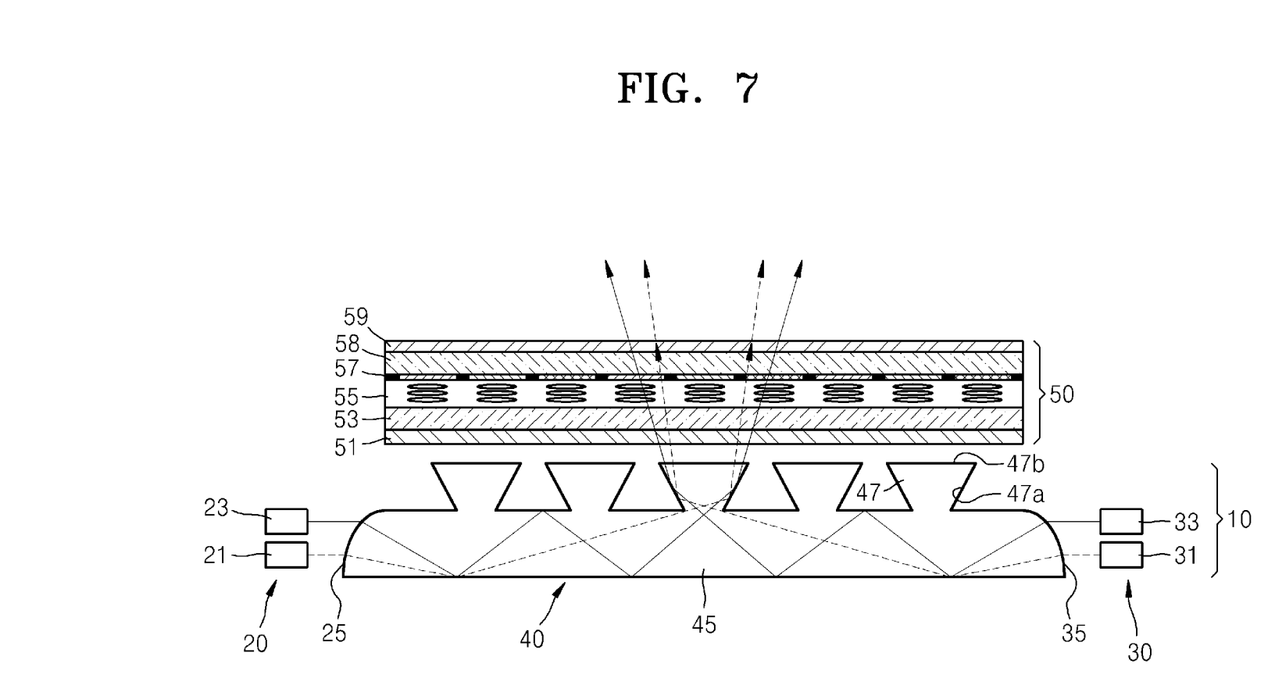
FIGS. 7 and 8 are, respectively, schematic views illustrating a backlight unit and a display device to which the backlight unit is applied, according to another example.

Alternatively, the first and second collimating lenses 25 and 35 of the backlight unit 10 may be formed as a single unit with the light guide plate 40 at the first and second light incident surfaces 41 and 43 of the light guide plate 40, as illustrated in FIG. 7. When the first and second collimating lenses 25 and 35 are formed as a single unit with the light guide plate 40, the light guide plate 40 may be injected as a single unit during an injection process in the manufacture thereof, and thus an assembly process of producing the backlight unit may have improved efficiency.

Figure 8:
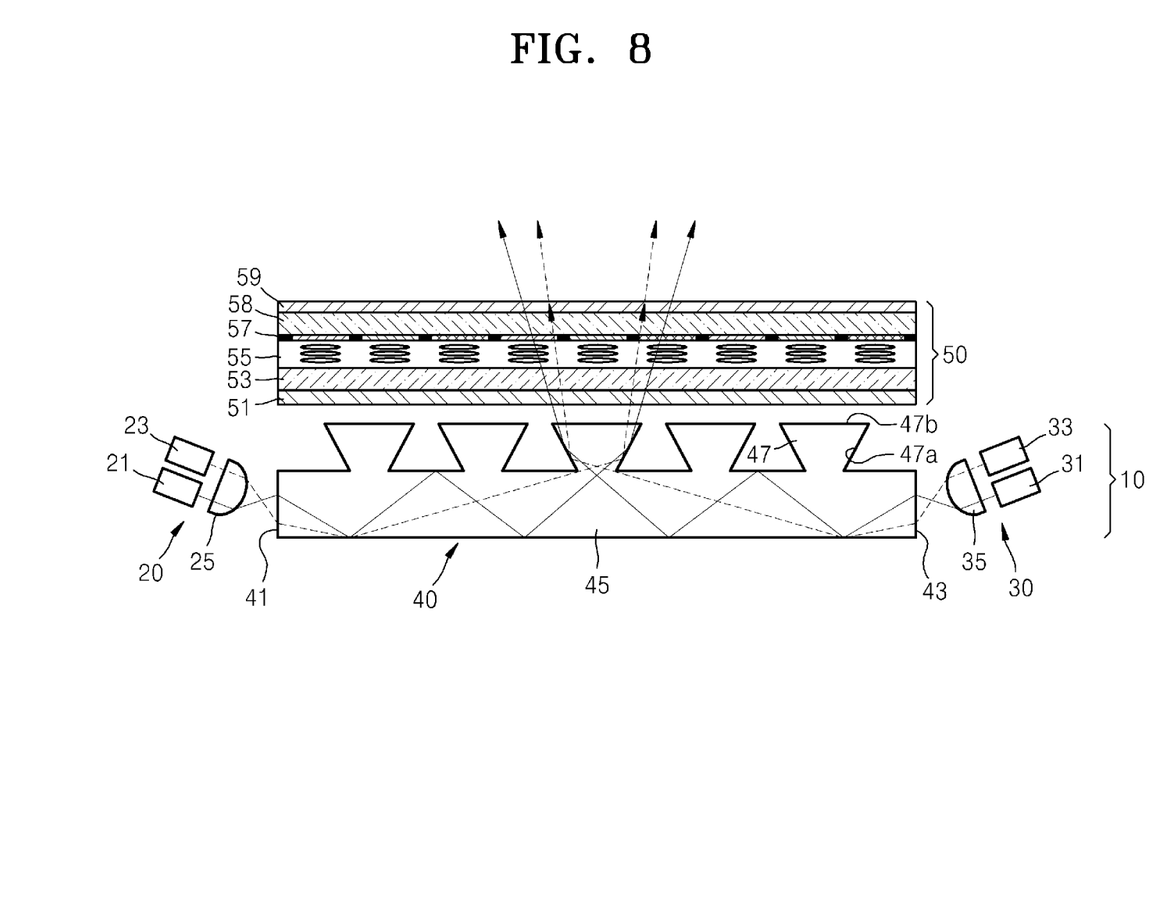

Also, the first and second light source units 20 and 30 of the backlight unit 10 may be inclined with respect to the first and second light incident surfaces 41 and 43 of the light guide plate 40 as illustrated in FIG. 8. By obliquely disposing the first and second light source units 20 and 30 to the first and second light incident surfaces 41 and 43 of the light guide plate 40, light emitted from the light source arrangement at different heights may be incident to the light guide plate 40 at different incident angles at different heights. As described above, when the light source units in which the light sources and the collimating lenses are coupled to each other are obliquely assembled, it is not necessary for the collimating lenses to be asymmetric to each other. Thus, the first and second collimating lenses 25 and 35 may be symmetric or asymmetric to each other. In FIG. 8, for example, the first and second collimating lenses 25 and 35 are substantially symmetric. An angle at which the first and second collimating lenses 25 and 35 are inclined may vary according to a size of the light guide plate 40 or a form of a structure of the light exit units 47.

Figure 9A:
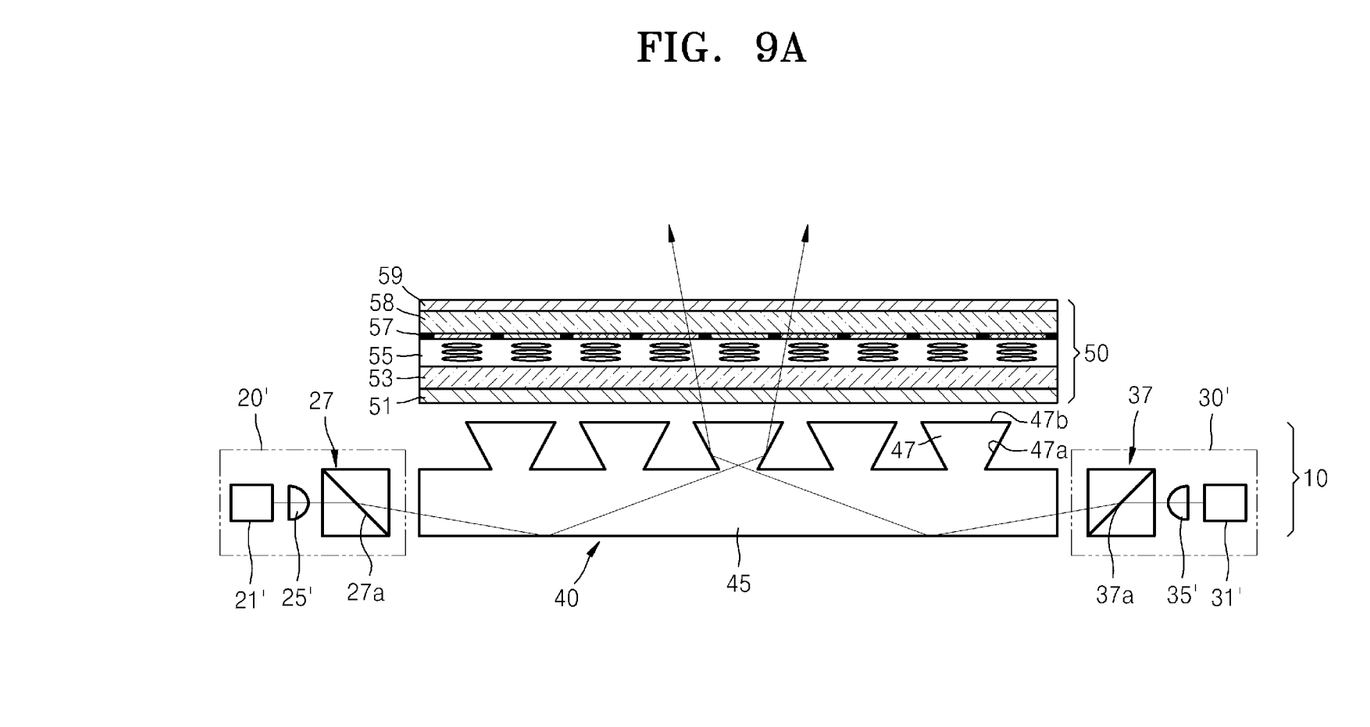
FIGS. 9A and 9b are schematic views illustrating a backlight unit and a display device including the backlight unit, according to another example.
Figure 9B:
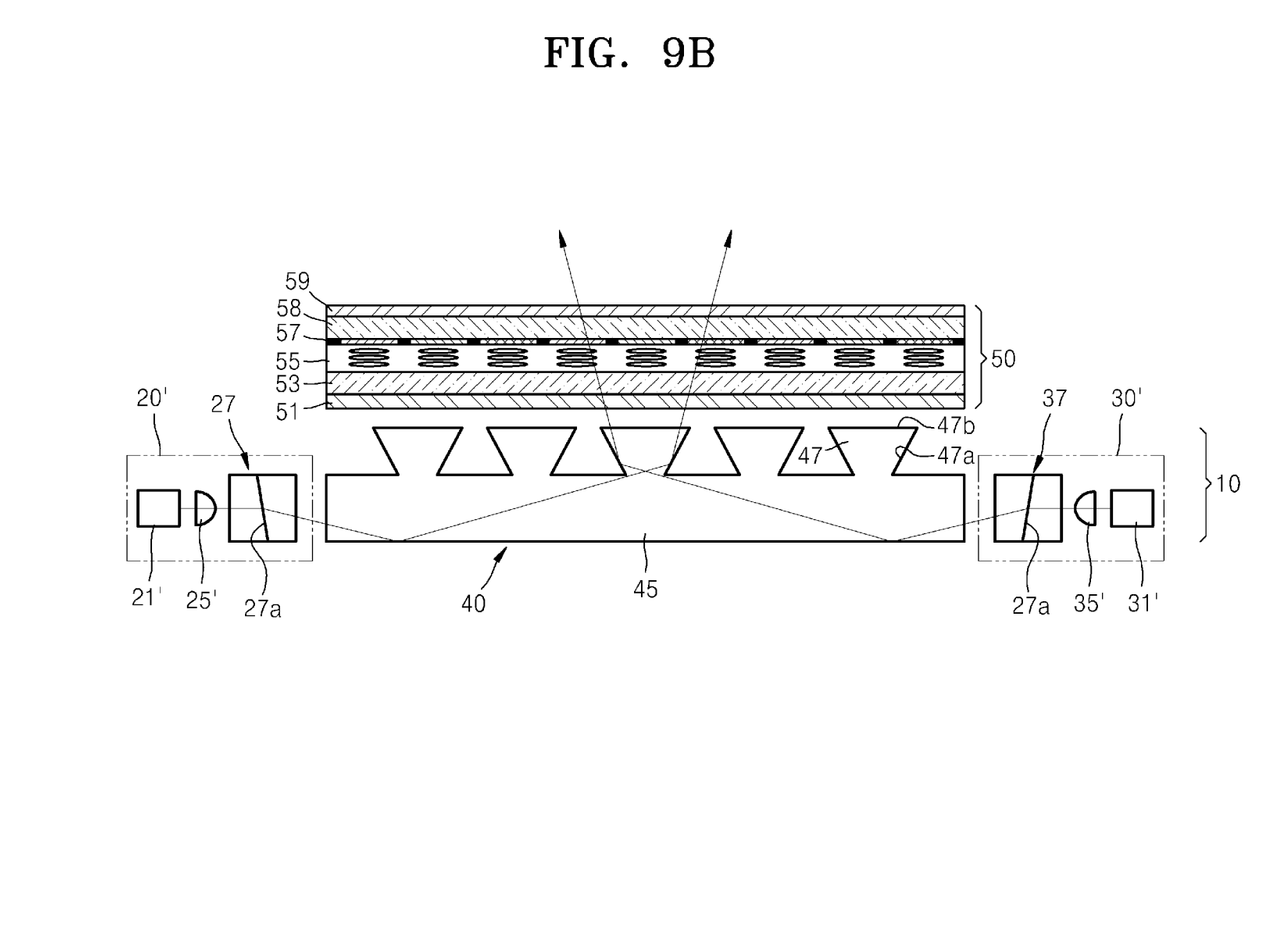

The light source units described above have a light source arrangement from which light is emitted at different heights, but the light source arrangement is not limited thereto. For example, as illustrated in FIGS. 9A and 9B, first and second light source units 20' and 30' are formed including light sources 21' and 31' collimating lenses 25' and 35' that are disposed between the light sources 21' and 31' and the light guide plate 40 to collimate incident light. Devices 27 and 37 are electrically adjustable so as to convert a proceeding direction of the light emitted from the light sources 21' and 31', so that an angle of light that is incident to the light guide plate 40 is varied by the devices 27 and 37 to control a light exit direction of the light emitted from the light guide plate 40. Here, the light sources 21' and 31' may include a plurality of light sources that are arranged serially at substantially the same height. The collimating lenses 25' and 35' may have a substantially symmetric structure. The electrically adjustable devices 27 and 37 are disposed between the collimating lenses 25' and 35' and the light guide plate 40 so as to convert a proceeding direction of light that is collimated by the collimating lenses 25' and 35'. The electrically adjustable devices 27 and 37 include inclined surfaces 27a and 37a of which an inclination can be adjusted For example, the inclination angle of the inclined surfaces 27a and 37a may be adjusted electrically, as illustrated in FIGS. 9A and 9B, so as to vary incident angles of light that are emitted from the light sources 21' and 31', which are incident to the light guide plate 40, thereby converting a light exit direction of the light emitted from the light guide plate 40. Examples of the electrically adjustable devices 27 and 37 include an electrowetting prism having a surface in the form of a liquid prism, wherein a direction of the surface is electrically controlled, a device including liquid crystals, and a material having electric-optical effects.

Figure 10:
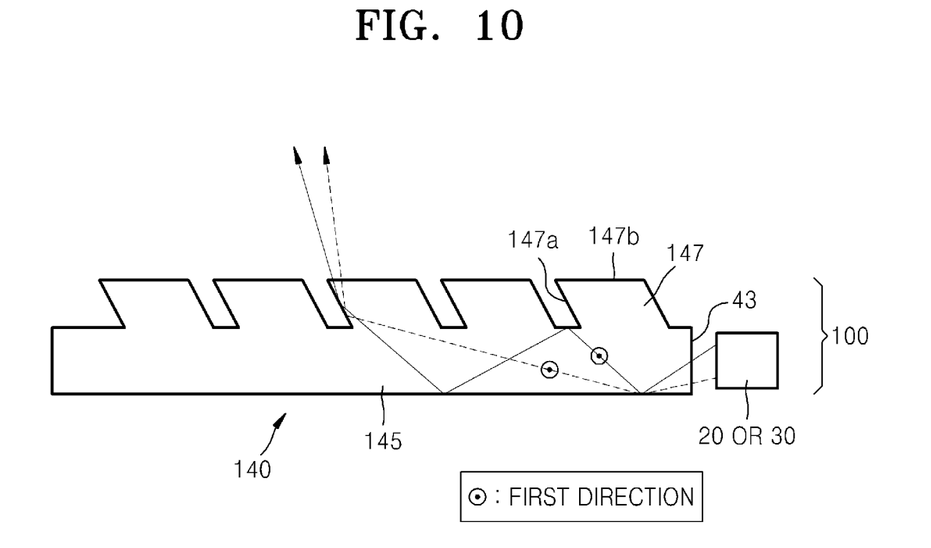
FIG. 10 is a schematic view illustrating a light guide plate, according to another example.

Also, the light exit units 47 of the light guide plate 40 described above have a linear form having inverted trapezoidal protrusions, but the examples described herein not limited thereto. FIG. 10 is a schematic view illustrating the light guide plate 140 including a light guide plate 140, according to another example. Referring to FIG. 10, in the backlight unit 100, a light exit unit 147 of the light guide plate 140 may have a light exit surface 147b through which light is emitted. The light exit unit 147 may have a linear form having a form equal to a cross-section through which light is incident from the light guide unit 145 (that is, a parallelogram protrusion). When the light exit unit 147 has a linear form having a parallelogram protrusion, an inclined total internal reflection surface 147a that is inclined to the light guide unit 145 is disposed only at one side of the light exit unit 147, and thus a light source unit 120 may be disposed only at one side of the light guide plate 140.

As described above, when the light guide plate 140 has light exit structures in the form of a parallelogram, incident light may be emitted not through irregular diffusion, but through total internal reflection of surfaces of the light guide plate 140. Accordingly, even when the light exit unit 147 has the above-described parallelogram protrusions, light incident to the light guide plate 140 may maintain its characteristics (for example, a collimated state), and speckles, which occur when light is diffused on irregular surfaces, are substantially prevented from occurring.

The display device according to the above examples may include the light guide plate 140 having a light exit structure in the form of parallelograms, as illustrated in FIG. 10. That is, instead of the light guide plate 40 including the light exit units 47 having a linear form and having inverted trapezoidal protrusions and the backlight unit 10 including the first and second light source units 20 and 30 disposed at two sides of the light guide plate 40, the examples illustrated in FIGS. 1, 7, 8, 9A, and 9B may alternatively include the light guide plate 140 as illustrated in FIG. 10 and the backlight unit 100 including one light source unit 120 disposed at one side of the light guide plate 140. The light source unit 120 may have various configurations as that of the first or second light source unit 20 or 30 described above.

Referring to FIGS. 1, 7, 8, 9A, 9B, and 10, in the display device including the backlight unit 10 or 100 according to the examples described above, the panel type light modulation device 50 may modulate light emitted from the light guide plate 40 or 140 according to an input image signal, to display an image. As the panel-type light modulation device 50, a transmissive liquid crystal display device may be applied.

When the transmissive liquid crystal display device is used as the panel type light modulation device 50, the panel type light modulation device 50 may include respective transparent substrates 53 and 58 at light incident and exit sides, a liquid crystal layer 55 disposed between the transparent substrates 53 and 58, and polarization plates 51 and 59 respectively disposed on the transparent substrates 53 and 58 at the light incident and exit sides. The panel type light modulation device 50 may also include a color filter 57.

The panel type light modulation device 50 illustrated in FIGS. 1, 7, 8, 9A, and 9B is provided as an example, and the described features are not limited thereto; any other various types of light modulation devices may be applied to display devices according to the examples described herein.

As described above, in a display device including the backlight unit 10 or 100 according to the above examples, the light exit direction may be sequentially controlled to scan light, and thus a high-density directional 3D display device may be provided.

In addition, described above is a high-density directional (HDD) 3D display device that is implemented by applying the backlight unit 10 or 100; however, the described examples are not limited thereto.

For example, a light source unit may be configured such that red, green, and blue light sources respectively emitting red, green, and blue light are disposed at different heights, and the backlight unit 10 may be configured such that light exit directions of color lights of the red, green, and blue light are separated and aligned in pixels of the panel type light modulation device 50. Accordingly, a color image may be formed using the liquid crystal layer only, without a color filter. In this example, in FIGS. 1, 7, 8, 9A, and 9B, the light source arrangement indicates the arrangement of the color lights.

A number of examples have been described above. It should be understood that the examples described herein should be considered in a descriptive sense only and not for purposes of limitation. Descriptions of features or aspects within each embodiment should typically be considered as available for other similar features or aspects in other embodiments. For example, suitable results may be achieved if the described techniques are performed in a different order, and/or if components in a described system, architecture, device, or circuit are combined in a different manner and/or replaced or supplemented by other components or their equivalents. Accordingly, other implementations are within the scope of the following claims.

What is claimed is:

1. A backlight unit comprising:
   a light source unit for providing collimated light and for controlling the collimated light to be emitted in a plurality of light exit directions, the light source unit comprising a plurality of light sources arranged in a stepwise arrangement such that heights of the plurality of light sources vary stepwise, and the stepwise arrangement is repeated at least once such that each of a first group of light sources and a second group of light sources comprises at least one light source that is positioned at each height; and
   a light guide plate comprising a light guide unit for guiding light incident from the light source unit by internal reflection, and a plurality of light exit units that are formed as protrusions on a surface of the light guide unit to emit light proceeding through the light guide unit by reflection.

2. The backlight unit of claim 1, wherein the light source unit further comprises:
   a collimating lens that is disposed at a light incident surface of the light guide plate, and which collimates incident light and emits light from the plurality of light sources in different light exit directions from the light guide plate.

3. The backlight unit of claim 2, wherein the collimating lens refracts the light incident vertically from the plurality of light sources to be incident to the light guide plate at different incident angles.

4. The backlight unit of claim 3, wherein the collimating lens is disposed between the plurality of light sources and the light guide plate such that a curved lens surface of the collimating lens is separated from the light incident surface of the light guide plate.

5. The backlight unit of claim 2, wherein the collimating lens is formed as a single unit with the light guide plate at the light incident surface of the light guide plate such that light emitted from the plurality of light sources is incident to the light guide plate at different incident angles.

6. The backlight unit of claim 1, wherein the light source unit is inclined to the light incident surface of the light guide plate such that light emitted from the plurality of light sources is incident to the light guide plate at different incident angles.

7. The backlight unit of claim 6, wherein the collimating lens is substantially symmetric.

8. A backlight unit comprising:
   a light source unit for providing collimated light and for controlling the collimated light to be emitted in a plurality of light exit directions; and
   a light guide plate comprising a light guide unit for guiding light incident from the light source unit by internal reflection, and a plurality of light exit units that are formed as protrusions on a surface of the light guide unit to emit light proceeding through the light guide unit by reflection,
   wherein the light source unit comprises:
   a light source;
   a collimating lens disposed between the light source and the light guide plate, and being configured to collimate incident light; and
   a device disposed between the collimating lens and the light guide plate, the device being electrically adjustable to adjust a proceeding direction of the collimated light,
   wherein a light exit direction is controlled by varying an incident angle of light that is incident to the light guide plate by applying a signal to the electrically adjustable device.

9. The backlight unit of claim 8, wherein the electrically adjustable device is an electrowetting prism.

10. The backlight unit of claim 1, wherein the light source unit is formed as a first light source unit and a second light source unit which are disposed at substantially opposing sides of the light guide plate.

11. The backlight unit of claim 10, wherein the light exit units have a linear form having inverted trapezoidal protrusions.

12. The backlight unit of claim 1, wherein the light source unit is disposed at a side of the light guide plate, and the light exit units have a linear form having inverted trapezoidal protrusions.

13. A display device comprising:
   the backlight unit of claim 1; and
   a light modulation device that modulates light emitted from the backlight unit according to an input image signal to display an image.

14. The display device of claim 13, wherein the light source unit of the backlight unit comprises:
   a plurality of light sources located at different heights to emit light at different heights in a thickness direction of the light guide plate; and
   a collimating lens that is disposed at a light incident surface of the light guide plate, and which collimates incident light and emits light from the plurality of light sources in different light exit directions from the light guide plate.

15. The display device of claim 13, wherein the light source unit is formed as a first light source unit and a second light source unit which are disposed at substantially opposing sides of the light guide plate.

16. The display device of claim 15, wherein the plurality of light exit units have a linear form having inverted trapezoidal protrusions.

17. The display device of claim 13, wherein the light source unit is disposed at a side of the light guide plate, and the light exit units have a linear form having inverted trapezoidal protrusions.

18. The display device of claim 13, wherein the plurality of light sources are sequentially driven to scan a collimated light beam to form a three-dimensional image.

19. The display device of claim 13, wherein the light modulation device is a panel-type light modulation device.

* * * * *